June 7, 1966  R. M. CARRIER, JR  3,254,879
AGITATING APPARATUS
Filed Oct. 27, 1964  2 Sheets-Sheet 1
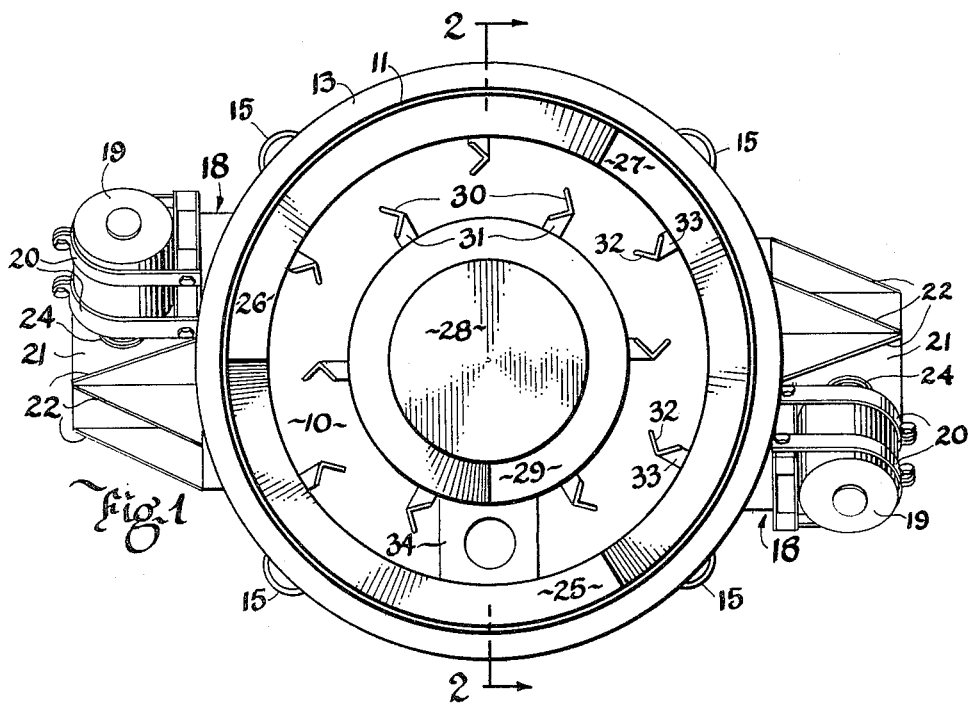
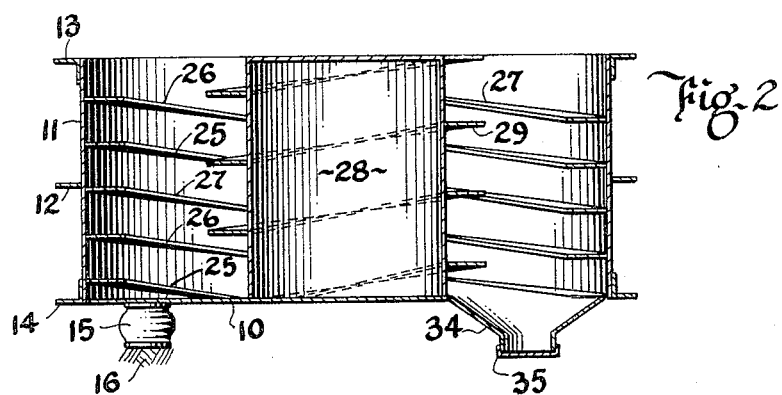
INVENTOR.
ROBERT M. CARRIER JR.
BY Marshall, Wilson & Yeasting
attys.

June 7, 1966   R. M. CARRIER, JR   3,254,879
AGITATING APPARATUS
Filed Oct. 27, 1964   2 Sheets-Sheet 2
Fig. 3
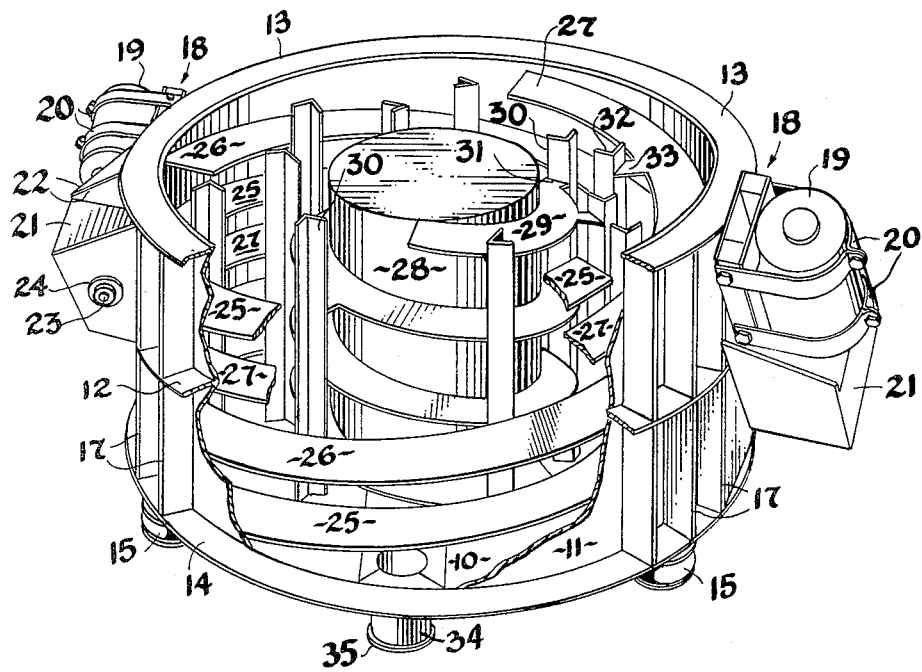
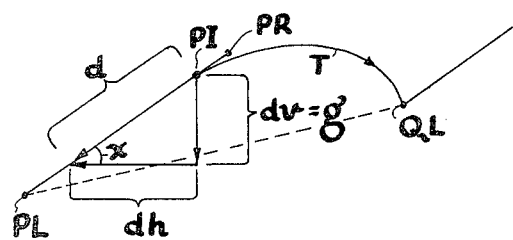
Fig. 4
INVENTOR.
ROBERT M. CARRIER JR.
BY
Marshall, Wilson & Yeasting
att'ys.

United States Patent Office 3,254,879
Patented June 7, 1966

3,254,879
AGITATING APPARATUS
Robert M. Carrier, Jr., Louisville, Ky., assignor to Carrier Manufacturing Co., Jeffersonville, Ind., a corporation of Kentucky
Filed Oct. 27, 1964, Ser. No. 406,852
8 Claims. (Cl. 259—29)

The invention relates to agitating apparatus for inducing vigorous circulation of a flowable material.

The most common type of agitating apparatus heretofore known consists of a vessel containing a stirring device which is oscillated or rotated by means of an external source of power. The problem of driving the stirrer in such apparatus involves various difficulties. If the stirrer is driven from above, the driving mechanism interferes with access to the apparatus at the top. If the stirrer is driven from below, it is necessary to provide at the point where the drive shaft enters the vessel a seal which is difficult to maintain.

Another difficulty in the case of a vessel provided with a stirrer arises from the fact that a stirrer is relatively inefficient in that it agitates only the material in direct contact with the stirrer. For this reason, a vessel containing a stirrer is usually employed only with free-flowing liquids.

In order to agitate solid materials, it has been necessary heretofore to use relatively expensive apparatus such as tumbling mills.

Another difficulty with the various types of agitating apparatus heretofore known is that they apply pressure and friction to the material. For this reason the types of apparatus heretofore known are not suitable for handling materials which are undesirably compacted by application of pressure, or for handling materials which are liable to explode when subjected to excessive friction.

The principal object of the invention is to provide an inexpensive but highly efficient agitating apparatus for inducing vigorous circulation of a flowable material, which employs no relatively moving parts in contact with the material and thus does not exert pressure or friction upon the material. More specific objects and advantages are apparent from the following description, in which reference is had to the accompanying drawings illustrating a preferred embodiment of the invention.

The present apparatus for inducing vigorous circulation of a flowable material comprises a vessel which is substantially round in horizontal section and which is subjected to a helical vibratory movement. It is known to impart a helical vibratory movement to a helical conveyor consisting of a helical trough along which material is caused to flow. In this known type of helical conveyor in which a helical trough is subjected to a helical vibratory movement, the material is thrown tangentially in the trough at the end of each upward helical stroke of the vibratory movement. In this way all of the material in the helical trough is propelled a short distance along the trough at the end of each helical upward stroke, so that the helical vibratory movement causes the material to move progressively along the trough in one direction. If the helical upward stroke is a clockwise movement, the material will be moved clockwise along the helical trough. If the helical upward stroke is a counterclockwise movement, the material will be moved counterclockwise along the helical trough.

An agitating apparatus embodying the present invention comprises agitating means of spiral vane-like configuration fixed substantially concentrically in the vessel. The vessel is mounted for limited vertical movement and for limited rotation on its vertical axis, and is provided with mechanism for imparting to the vessel a helical vibration about its vertical axis, the inclination of such helical vibration being in the same sense but greater in degree than that of the spiral configuration of the agitating means so that the vibration causes the material to flow spirally upward along the agitating means. At the same time, there is a downward return flow of the material at other points in the vessel so that vigorous circulation of the material takes place. Also, the agitating means extends from a level adjacent the bottom of the vessel and terminates in an upper portion shaped to direct the material into the vessel for recirculation, so that the agitating means is extremely effective in inducing circulation of the material throughout the vessel. The helical vibration of the vessel also causes the material in the vessel to rotate as a whole, and such rotation is superimposed upon the vertical circulation produced by the agitating means.

FIG. 1 of the drawings is a plan view of a preferred form of agitating apparatus embodying the invention.

FIG. 2 is a vertical section taken on the line 2—2 of FIG. 1.

FIG. 3 is a perspective view of the apparatus with portions broken away to show the internal structure.

FIG. 4 is a diagram illustrating the motion that may be imparted to a particle of material in the apparatus.

These specific drawings and the specific description that follows are intended to disclose and illustrate and not to limit the invention.

In an apparatus embodying the invention, the vessel preferably is in the form of a cylinder having vertical walls, but a vessel having conical or tapered walls may be employed, if desired. The agitating means of spiral vane-like configuration in the vessel preferably is adjacent the side walls of the vessel. Preferably the agitating means includes a continuous spiral vane extending from a point adjacent the bottom of the vessel to a point adjacent the top of the vessel. If desired, however, the agitating means may consist of a series of relatively short spiral vanes instead of a single continuous spiral vane.

The agitating apparatus shown in the drawings includes a vessel having a flat bottom 10 and a vertical cylindrical side wall 11. The side wall 11 is reinforced on the exterior of the vessel by a central horizontal flange 12, a top flange 13 and a bottom flange 14.

In order to support the vessel, the lower flange 14 is carried on four flexible rubber bags 15 which rest upon a fixed support 16. The rubber bags 15 preferably are filled with a liquid, but they may be filled with air under pressure or they may contain both air and a liquid. The rubber bags 15 support the vessel resiliently and provide the vessel with a limited freedom of movement in all directions.

In place of the flexible rubber bags 15 it is possible to employ any other type of mounting that provides the vessel with a limited freedom of vertical movement and also allows the vessel limited rotation on its vertical axis. For example, the vessel may be hung or seated upon springs. The rubber bags 15 are advantageous because they have an insulating or cushioning action which minimizes the transmission of vibratory forces into a building or other structure in which the apparatus is located.

In the region lying immediately above each of the rubber bags 15, the side wall 11 of the vessel is externally reinforced by three vertically extending webs 17.

The apparatus shown in the drawings includes mechanism for imparting to the vessel a helical vibration about its vertical axis. Two frames 18 are secured to the vertical side wall 11 in diametrically opposed positions, and an electric motor 19 is mounted upon each of the frames 18 by means of straps 20. Also mounted on each of the frames 18 is a rectangular casing 21 which is reinforced by gussets 22. A shaft 23 (FIG. 3) which is coaxial with the shaft of the motor 19 extends through each of the casings 21 and is supported in bearings 24 which are mounted in two opposed walls of each casing 21. Each of the shafts 23 is driven by a motor 19 and is coupled to the shaft of the motor by means of a suitable coupling. Inside each of the casings 21, an eccentric weight (not visible in the drawings) is fixed upon each of the shafts 23.

The motors 19 are driven in the same direction; for example, they both may be driven clockwise as viewed from above. As soon as the motors 19 are started, they lock into synchronism with one another; with the eccentric weights are directed inward toward the vertical axis of the vessel at the same instant, and are directed outward away from the vertical axis of the vessel at the same instant. With the eccentric weights phased in this manner, the weights during each complete rotation of the shafts 23 first produce a couple tending to rotate the vessel in one direction and then produce a couple tending to rotate the vessel in the opposite direction. Thus during each complete rotation of the shafts 23, the vessel executes one complete oscillation on its vertical axis. Also, because of the fact that the shafts 23 are inclined at equal and opposite angles to the horizontal, each complete rotation of the shafts not only causes one complete oscillation of the vessel on its vertical axis but also causes one complete vertical reciprocation of the vessel. The resultant of the combined oscillation and vertical reciprocation of the vessel is a helical vibratory movement of the vessel.

In place of the mechanism shown in the drawings, any other desired mechanism may be employed for imparting a helical vibratory movement to the vessel. Various other mechanisms for imparting such a movement are known and are used for driving helical vibratory conveyors.

In order that the flexible rubber bags 15 may perform the function of minimizing the transmission of vibratory forces into the foundation on which the apparatus is supported, the natural frequency of the system consisting of the flexible rubber bags 15 and the mass supported thereon preferably is substantially below the frequency at which the vessel is vibrated by the motors 19.

In the apparatus shown in the drawings, the principal agitating means consists of three continuous spiral vanes 25, 26 and 27, each of which extends from the bottom 10 of the vessel to a point adjacent the top of the vessel.

A post 28 which is erected on the bottom 10 of the vessel is surrounded by an auxiliary spiral vane 29 which extends from the bottom to the top of the vessel. Preferably the top of the post 28 is flush with the top of the vessel, and the auxiliary spiral vane 29 extends all the way to the top of the post 28, while the spiral agitating vanes 25, 26 and 27 terminate somewhat short of the top of the vessel.

The vessel also contains eleven baffles, each of which consists of a vertically arranged angle having its lower end welded to the bottom 10 of the vessel. Six baffles 30 are located adjacent to the auxiliary spiral vane 29 and have their upper ends secured to the auxiliary spiral vane 29 as at 31. Five baffles 32 are located adjacent to the outer spiral agitating vanes and have their upper ends secured as at 33 to one of such outer vanes.

The helical vibration of the vessel causes the material in the vessel as a whole to rotate in a counterclockwise direction as seen in FIG. 1. The inner baffles 30 divert some of the rotating material into the auxiliary spiral vane 29, which carries the material downward. At the same time, the outer baffles 32 divert some of the rotating material onto the outer spiral agitating vanes, which carry the material upward. Thus the baffles 30 and 32 assist in the agitation and mixing of the material in the vessel.

The vessel also is provided with a suitable outlet 34. Whenever the apparatus is used to handle successive batches as distinguished from a continuous flow of material, a cap 35 may be placed over the lower end of the outlet 34 to prevent material for escaping from the outlet while a batch is being subjected to agitation. After the agitation or mixing of the batch is completed, the cap 35 is removed, and the helical vibration of the vessel is continued while the material is discharged through the outlet 34. Because of the fact that the helical vibration causes the material to rotate in the vessel, the discharge of material through the outlet 34 will continue until all of the material has left the vessel. Thus the apparatus is self-cleaning.

The vessel is shown in the drawings as open at the top, but it may be covered if desired. FIG. 4 illustrates the manner in which a particle of material in the vessel, for example a particle resting on one of the spiral agitating vanes 25, 26 or 27, is propelled during the helical upward movement of the vessel. The line PL–PR represents the path of vibratory movement of a point on the upper surface of one of the spiral agitating vanes. Although the path of vibratory movement of such a point actually is helical, FIG. 4 is shown as a projection on a vertical plane so that the path of vibratory movement PL–PR is shown as a straight line.

As a point on the upper surface of one of the agitating vanes travels through the path PL–PR from left to right during the upward movement of the vessel, a particle of material resting on the spiral vane at that point tends to travel through the same path. However, as the vessel approaches the upper end of its vibratory movement, its upward movement is decelerated. If the deceleration of the upward movement of the vessel is greater than the downward acceleration of a particle resting on the vane that is produced by the force of gravity acting upon the particle, the vessel will be decelerated and stopped so quickly at the upper extremity of its vibratory movement that the force of gravity acting upon the particle will not cause the particle to remain in contact with the upper surface of the vane, and the particle will in effect become a projectile traveling in a trajectory such as that indicated at T in FIG. 4.

Although the path of vibratory movement PL–PR is a helical path, the trajectory T lies in a vertical plane which is tangent to the helix PL–PR at the point PI (the point at which the particle leaves the surface of the spiral vane during the upward helical movement of the vessel).

FIG. 4 includes a vector diagram in which the vector $d$ represents the deceleration of the vessel at the instant when a point on the upper surface of one of the spiral agitating vanes is at the position PI. The vector $d$ may be resolved into a vertical component $dv$ and a horizontal component $dh$.

The inertia of a particle of material resting on the upper surface of the vane at the position PI tends to keep the particle moving in a straight line in the direction and at the velocity at which the particle is traveling at the position PI. The horizontal component $dh$ is the component of the deceleration of the vessel which tends to cause the inertia of the particle to slide the particle forward along the spiral vane, and the vertical component $dv$ is the component of the deceleration $d$ which tends to cause the inertia of the particle to lift the particle off the surface of the vane.

In the case illustrated in FIG. 4, the vertical component $dv$ of the deceleration $d$ of the vessel at the instant when the particle is at the position PI is equal to the downward acceleration $g$ produced by the force of gravity acting upon the particle. In other words, $d \sin x$ equals $g$. Thus the pressure of the particle against the upper surface of the vane is zero at the position PI. Then as the vessel continues to travel upward in its vibratory movement, the deceleration of the vessel will increase until it reaches a maximum at the instant when the vessel reaches the upper extremity of its stroke. Accordingly, after the particle has moved past the position PI the downward acceleration produced by gravity will not cause the particle to remain in contact with the upper surface of the spiral vane.

In the case illustrated in FIG. 4, the conditions are such that the particle after passing the position PI will travel through the trajectory T, and the impact of the particle on the upper surface of the spiral vane at the position QL will occur at the instant when the vessel reaches the lower extremity of its reverse movement. After the particle strikes the upper surface of the spiral vane at the position QL, it will remain on the surface of the spiral vane while the vessel executes the initial part of its succeeding upward movement and will be subjected to forces similar to those to which it was subjected during the preceding stroke, so that the particle then will follow a path as indicated in FIG. 4 which is similar to the path that the particle followed in traveling from the position PL to the position QL. In the case illustrated in FIG. 4 it is assumed that there is no bouncing or slipping of the particle on the upper surface of the spiral vane.

The vertical component of the maximum deceleration which is attained at the instant when the vessel reaches the upper extremity of its stroke may be computed in inches per second from the equation $$dv_{max.} = 19.74 f^2 s_v$$

in which $f$ is the frequency of vibration in cycles per second and $s_v$ is the vertical component of the stroke (for example, $PL-PR \sin x$) in inches.

The foregoing explanation of the vector diagram in FIG. 4 shows that if $dv_{max.}$ is greater than $g$, a particle resting on one of the spiral agitating vanes will leave the upper surface of the vane during its upward vibratory movement of the vessel.

However, the apparatus will function even if $dv_{max.}$ is somewhat less than $g$. It is not necessary that particles resting on the spiral agitating vanes actually leave the vanes as the vessel approaches the upper end of its vibratory movement, because of the slippage of particles resting on the vanes which occurs as the deceleration of the vessel approaches a maximum near the upper end of the vibratory movement of the vessel. This slippage occurs as the vessel approaches the upper end of its vibratory movement because of the fact that the inertia of the particles tends to keep the particles moving at a constant velocity. As the vessel approaches the upper end of its vibratory movement, the velocity of the vessel is decreasing rapidly and the particles tend to maintain their velocity and direction of movement, and thus slide forward as the movement of the vessel decelerates.

It should be noted also that the deceleration of the vessel as it approaches the upper end of its stroke tends to counteract the force of gravity and thus tends to reduce the pressure of the particles against the upper surfaces of the spiral vanes, so as to reduce friction and enable the particles to slide forward along the vanes.

On the other hand, during the second half of the downward stroke of the vessel, the deceleration of the vessel is in the opposite direction and adds to the pressure of the particles against the upper surfaces of the vanes that is caused by the force of gravity. Thus the particles which are allowed to slide forward near the upper end of the vibratory stroke of the vessel are held tightly against the upper surfaces of the spiral vanes near the lower end of the stroke and are prevented from sliding backward under the action of the forces prevailing near the lower end of the stroke. The forward slippage of particles which is thus permitted near the upper end of the stroke, while backward slippage is prevented near the lower end of the stroke, occurs even when the deceleration of the vessel is not great enough to permit the particles to travel through the air in a trajectory such as the trajectory T in FIG. 4.

The foregoing discussion relates to the manner in which a particle resting on the upper surface of one of the spiral agitating vanes is propelled during the helical upward movement of the vessel. The particles of material resting upon the bottom 10 of the vessel are propelled in substantially the same manner. Thus the material in the vessel as a whole is caused to rotate in the vessel.

The helical vibration of the vessel causes each particle of material in the vessel to move in a helical path that substantially lies on a circular cylinder. In the case of a particle relatively close to the axis of the vessel, this circular cylinder has a relatively small radius so that the angle $x$ in FIG. 4 is relatively great. For a particle located at the axis of the vessel, the angle $x$ in FIG. 4 is 90°.

In an apparatus embodying the invention, the inclination of the helical vibration imparted to the vessel is in the same sense but greater in degree than the inclination of the spiral configuration of the agitating means. In other words, the angle $x$, measured at one of the spiral agitating vanes such as the vane 25, 26 or 27, is greater than the inclination of the vane.

The angle of inclination $x$ of the helical vibration of the vessel in the apparatus shown in the drawings is determined by the degree of inclination of the shafts 23, because the arcuate path of vibration of a point lying on the axis of one of the shafts 23 lies in a plane perpendicular to the axis of the shaft.

In FIG. 4, PL and QL represent the positions of two points on the upper surfaces of one of the spiral agitating vanes at the instant when the vessel is at the lower extremity of its helical vibratory movement. Thus the dashed line PL-QL, which is a line drawn through two points on the upper surface of one of the spiral agitating vanes, indicates the inclination of the vane.

The angle of inclination of the spiral agitating vanes may be from about 5° to about 40°. The angle $x$ in FIG. 4, measured at one of the spiral agitating vanes, should be from 5° to 40° greater than the angle of inclination of the vane. Thus the angle $x$ may be from about 10° to about 80°. Preferably the angle $x$ is from about 10° to about 30°, and the angle of inclination of each of the spiral agitating vanes is from about 5° to about 25°.

Preferably the frequency of vibration of the vessel is not more than 2000 cycles per minute, which is equal to 33⅓ cycles per second. Once the frequency of vibration and the angle $x$ are established, the length of stroke necessary to give the desired maximum acceleration can be determined from the above equation. The desired length of stroke can be obtained by varying the size and eccentricity of the eccentric weights which are fixed upon the shafts 23 inside the casings 21. However, the produce the desired helical vibratory movement, the size and eccentricity of the two weights should be the same.

In order to obtain the best results in the practice of the invention, it is desirable that the vertical component of the maximum acceleration of the vessel be at least as great as the acceleration of gravity, which is normally about 386 inches per second. The length of stroke required to provide a given maximum acceleration of the vessel increases as the frequency of vibration decreases.

Preferably the vessel in an apparatus embodying the invention is vibrated at a relatively low frequency with a relatively long stroke, ranging from 3/16 inch to one inch, measured at the inner surface of the side wall of the vessel. For example, the vessel may be vibrated with a stroke of ⅜ inch at a frequency as high as 1200 cycles per minute or as low as 400 cycles per minute. With motors operating at a speed of 900 r.p.m., the stroke preferably is from 3/16 to ¼ inch.

The agitation of the material in an apparatus embodying the invention is produced primarily by the spiral upward flow of the material along the agitating vanes. Preferably, these primary agitating vanes are located just inside the side wall of the vessel, where the arc of movement of the material is the longest, so that the material will flow upward along such vanes as rapidly as possible.

Each of the spiral vane-like agitating means along which the material flows spirally upward in an apparatus embodying the invention terminates in an upper portion shaped to direct the material into the vessel for recirculation. For example, the spiral agitating vanes 25, 26 and 27, as shown in the drawings, terminate short of the top of the vessel so that the material reaching the top of these vanes does not spill over the sides of the vessel but is directed back into the vessel for recirculation.

As the material flows spirally upward along the agitating vanes, the material in the lower part of the vessel flows outward onto the vanes. The use of vertical baffles in the apparatus is not necessary in all cases, but usually it is desirable to provide vertical baffles which are oriented in the vessel to deflect the rotating material onto these vanes, so as to assist in keeping the vanes filled with the material in the lower part of the vessel.

It is not necessary to provide a central post in the vessel in all cases, particularly when the diameter of the vessel is relatively small. However, if the vessel does not contain a central post, the material close to the axis of the vessel is agitated less than the material adjacent to the vane-like agitating means. Usually it is desirable to provide a central post in the vessel, such as the post 28 shown in the drawings, so that all of the material in the vessel will be at a minimum distance from the axis equal to the radius of the post. The presence of a central post in the vessel keeps all of the material moving at a suitable minimum linear rate as the material rotates in the vessel.

The auxiliary spiral vane 29 may be omitted if desired, but this auxiliary spiral vane is useful in keeping the material moving downward adjacent to the central post.

The path of movement of a particle of material resting on the upper surface of the auxiliary spiral vane 29 is similar to the path of movement shown in FIG. 4, except that the trajectory T of the particle extends farther downward because the point of impact of the particle on the upper surface of the auxiliary spiral vane is at a lower level than the point PL. In the case of the auxiliary spiral vane, the inclination of the vane is not upward toward the right as indicated by the dashed line PL–QL in FIG. 4 but is downward toward the right.

An apparatus embodying the invention is particularly useful for mixing granular solid materials. The rapid flow of the material which prevails at all points in the vessel causes rapid and homogenous mixing of granular materials. The material to be mixed may be placed in the vessel and mixed as a batch operation, the cap 35 being removed from the outlet at the end of the mixing operation to permit the mixture to be discharged through the outlet 34. Alternatively, the apparatus may be used as a continuous mixing apparatus by supplying continuous streams of the materials to be mixed at the top of the vessel and continuously withdrawing the mixture from the outlet 34.

An apparatus embodying the invention also may be used as a heater or dryer by applying steam or radiant heat to the exterior of the vessel. Also a vacuum may be maintained in the vessel if desired to assist in a drying operation.

An apparatus embodying the invention also may be used in place of a tumbling mill, for example for burnishing of small parts. Thus the charge in the vessel may consist of a mixture of small parts with an abrasive medium. The present apparatus is much smaller than a tumbling mill of the same capacity, and has a gentler but more efficient and more uniform action.

Because of the gentle, uniform action in an apparatus embodying the invention, the apparatus may be used advantageously for agitating materials which would be undesirably damaged, broken up or compacted in a tumbling mill or in an ordinary mixer containing a mechanical stirring device.

Having described the invention, I claim:

1. Agitating apparatus for inducing vigorous circulation of a flowable material, comprising, in combination, a vessel which is substantially round in horizontal section, a support on which the vessel is mounted for limited vertical movement and for limited rotation on its vertical axis, agitating means for spiral vane-like configuration fixed substantially concentrically in the vessel, and mechanism for imparting to the vessel a helical vibration about its vertical axis, the inclination of such helical vibration being in the same sense but greater in degree than that of the spiral configuration of the agitating means so that the vibration causes the material to flow spirally upward along the agitating means, the vessel having a passageway, extending from the top to the bottom of the vessel, through which material which has flowed spirally upward along the agitating means may recirculate downward under the influence of gravity, and the agitating means extending from a level adjacent the bottom of the vessel and terminating in an upper portion shaped to direct the material into the vessel for downward recirculation.

2. Agitating apparatus as claimed in claim 1 wherein the vertical component of the helical vibration has a maximum acceleration as least as great as the acceleration of gravity.

3. Agitating apparatus as claimed in claim 1 wherein the agitating means of spiral vane-like configuration is adjacent the inner side walls of the vessel.

4. Agitating apparatus as claimed in claim 1 wherein the agitating means includes a continuous spiral vane extending from a point adjacent the bottom of the vessel to a point adjacent the top of the vessel.

5. Agitating apparatus as claimed in claim 1 wherein the vessel has an outlet in its bottom for discharge of material therefrom.

6. Agitating apparatus for inducing vigorous circulation of a flowable material, comprising, in combination, a vessel which is substantially round in horizontal section, a support on which the vessel is mounted for limited vertical movement and for limited rotation on its vertical axis, agitating means of spiral vane-like configuration fixed substantially concentrically in the vessel, mechanism for imparting to the vessel a helical vibration about its vertical axis, the inclination of such helical vibration being in the same sense but greater in degree than that of the spiral configuration of the agitating means so that the vibration causes the material to flow spirally upward along the agitating means and also causes the material as a whole to rotate in the vessel, and the agitating means extending from a level adjacent the bottom of the vessel and terminating in an upper portion shaped to direct the material into the vessel for recirculation, and vertical baffles which are oriented in the vessel to deflect the rotating material onto the agitating means.

7. Agitating apparatus for inducing vigorous circulation of a flowable material, comprising, in combination, a vessel which is substantially round in horizontal section, a support on which the vessel is mounted for limited vertical movement and for limited rotation on its vertical axis, agitating means of spiral vane-like configuration fixed substantially concentrically in the vessel, mechanism for imparting to the vessel a helical vibration about its vertical axis, the inclination of such helical vibration being in the same sense but greater in degree than that of the spiral configuration of the agitating means so that the vibration causes the material to flow spirally upward along the agitating means and also causes the material as a whole to rotate in the vessel, and the agitating means extending from a level adjacent the bottom of the vessel and terminating in an upper portion shaped to direct the material into the vessel for recirculation, a vertical post fixed centrally in the vessel, and auxiliary agitating means of spiral vane-like configuration inclined in the opposite sense and fixed to the sides of the post, to cause material to flow spirally downward along the sides of the post.

8. Agitating apparatus for inducing vigorous circulation of a flowable material, comprising, in combination, a vessel which is substantially round in horizontal section, a support on which the vessel is mounted for limited vertical movement and for limited rotation on its vertical axis, agitating means of spiral vane-like configuration fixed substantially concentrically in the vessel, mechanism for imparting to the vessel a helical vibration about its vertical axis, the inclination of such helical vibration being in the same sense but greater in degree than that of the spiral configuration of the agitating means so that the vibration causes the material to flow spirally upward along the agitating means and also causes the material as a whole to rotate in the vessel, and the agitating means extending from a level adjacent the bottom of the vessel and terminating in an upper portion shaped to direct the material into the vessel for recirculation, a vertical post fixed centrally in the vessel, auxiliary agitating means of spiral vane-like configuration inclined in the opposite sense and fixed to the sides of the post, to cause the material to flow spirally downward along the sides of the post, and vertical baffles in the vessel for deflecting the rotating material outward to the first-named agitating means and inward to the second-named agitating means.

References Cited by the Examiner
UNITED STATES PATENTS 2,663,554  12/1953  Langen _____ 259—72

IRVING BUNEVICH, *Primary Examiner.*

WALTER A. SCHEEL, *Examiner.*

ROBERT W. JENKINS, *Assistant Examiner.*

UNITED STATES PATENT OFFICE
CERTIFICATE OF CORRECTION

Patent No. 3,254,879                  June 7, 1966

Robert M. Carrier, Jr

It is hereby certified that error appears in the above numbered patent requiring correction and that the said Letters Patent should read as corrected below.

Column 3, line 11, after "weights" insert -- phased in such a manner that both of the eccentric weights --; column 5, line 25, after "second" insert -- per second --; column 6, line 60, after "second" insert -- per second --; column 7, line 7, for "materal" read -- material --.

Signed and sealed this 22nd day of August 1967

(SEAL)
Attest:

ERNEST W. SWIDER                  EDWARD J. BRENNER
Attesting Officer                      Commissioner of Patents